United States Patent
Kubota et al.

(10) Patent No.: US 7,406,373 B2
(45) Date of Patent: Jul. 29, 2008

(54) ELECTRIC POWER STEERING SYSTEM

(75) Inventors: Masahiro Kubota, Yokohama (JP); Hiroshi Mouri, Yokohama (JP); Tadashi Tamasho, Kanagawa (JP); Ryota Shirato, Yokohama (JP); Takayuki Sonoda, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 819 days.

(21) Appl. No.: 10/980,326

(22) Filed: Nov. 4, 2004

(65) Prior Publication Data

US 2005/0109556 A1    May 26, 2005

(30) Foreign Application Priority Data

Nov. 21, 2003    (JP) .............................. 2003-392825

(51) Int. Cl.
*B62D 5/04*    (2006.01)
*G06F 17/00*    (2006.01)

(52) U.S. Cl. .............................. 701/41; 701/42; 180/446

(58) Field of Classification Search .................... 701/41, 701/42, 43; 180/446, 421, 443; 340/441
See application file for complete search history.

(56) References Cited

U.S. PATENT DOCUMENTS

| | | | |
|---|---|---|---|
| 5,907,277 A * | 5/1999 | Tokunaga ................... | 340/441 |
| 6,148,948 A | 11/2000 | Shimizu et al. | |
| 6,364,051 B1 * | 4/2002 | Kada et al. .................. | 180/446 |
| 6,711,484 B2 | 3/2004 | Kifuku et al. | |
| 6,892,120 B2 * | 5/2005 | Kanda ......................... | 701/41 |

FOREIGN PATENT DOCUMENTS

| | | |
|---|---|---|
| JP | 10-278814 A | 10/1998 |
| JP | 11-034902 A | 2/1999 |
| JP | 2001-122139 A | 5/2001 |
| JP | 2002-331948 A | 11/2002 |
| JP | 2003-118610 A | 4/2003 |

* cited by examiner

*Primary Examiner*—Tan Q Nguyen
(74) *Attorney, Agent, or Firm*—Foley & Lardner LLP

(57) ABSTRACT

An electric power steering system for an automotive vehicle, including a steering torque detecting device which detects a steering torque of a steering shaft. An electric motor is provided to generate an assist torque for assisting a driver's steering effort required for steering the vehicle and a counter-assist torque for increasing the driver's steering effort. The assist torque and the counter-assist torque are applied to a steering mechanism. Additionally, a controller is provided to output a drive command to the electric motor in accordance with the detected steering torque. The drive command is for causing the electric motor to generate the counter-assist torque when the detected steering torque is a transitional torque.

8 Claims, 5 Drawing Sheets

ELECTRIC POWER STEERING SYSTEM

BACKGROUND OF THE INVENTION

This invention relates to improvements in an electric power steering system for an automotive vehicle.

In a conventional power steering system as disclosed in Japanese Patent Provisional Publication No. 2002-331948, when a steering torque is within a dead zone region, an assist torque in a direction to restore a steering wheel to a neutral position is generated in accordance with a steering angle, thereby improving a response characteristics for restoration of the steering wheel to the neutral position.

SUMMARY OF THE INVENTION

However, with the above conventional power steering system, for example when a vehicle runs on a road having a cant or under the influence of lateral wind, an assist torque for causing a steering wheel to return to a neutral position in assembly is generated at a steering angle at which the vehicle runs straight-ahead, thereby providing a foreign feeling to a driver.

It is an object of the present invention is to provide an improved electric power steering system which can effectively overcome drawbacks encountered in conventional electric power steering systems.

Another object of the present invention is to provide an improved electric power steering system which can provide a good steering feeling having a neutral steering feeling to a driver without providing any foreign feeling to the driver.

An aspect of the present invention resides in an electric power steering system which comprises a steering torque detecting device which detects a steering torque of a steering shaft. An electric motor is provided to generate an assist torque for assisting a driver's steering effort required for steering the vehicle and a counter-assist torque for increasing the driver's steering effort. The assist torque and the counter-assist torque are applied to a steering mechanism. Additionally, a controller is provided to output a drive command to the electric motor in accordance with the detected steering torque. The drive command is for causing the electric motor to generate the counter-assist torque when the detected steering torque is a transitional torque.

Another aspect of the present invention resides in an electric power steering system which comprises steering torque detecting means for detecting a steering torque of a steering shaft. An electric motor is provided to generate an assist torque for assisting a driver's steering effort required for steering the vehicle and a counter-assist torque for increasing the driver's steering effort. The assist torque and the counter-assist torque are applied to a steering mechanism. Control means is provided to output a drive command to the electric motor in accordance with the detected steering torque. The drive command is for causing the electric motor to generate the counter-assist torque when the detected steering torque is a transitional torque.

A further aspect of the present invention resides in a method of operating an electric power steering system. The method comprises (a) detecting a steering torque of a steering shaft; (b) generating an assist torque for assisting a driver's steering effort required for steering the vehicle and a counter-assist torque for increasing the driver's steering effort by using an electric motor, the assist torque and the counter-assist torque being applied to a steering mechanism; and (c) outputting a drive command from a controller to the electric motor in accordance with the detected steering torque, the drive command being for causing the electric motor to generate the counter-assist torque when the detected steering torque is a transitional torque.

BRIEF DESCRIPTION OF THE DRAWINGS

In the drawings, like reference numerals designate like parts and elements throughout all figures.

DETAILED DESCRIPTION OF THE INVENTION

Figure 1:
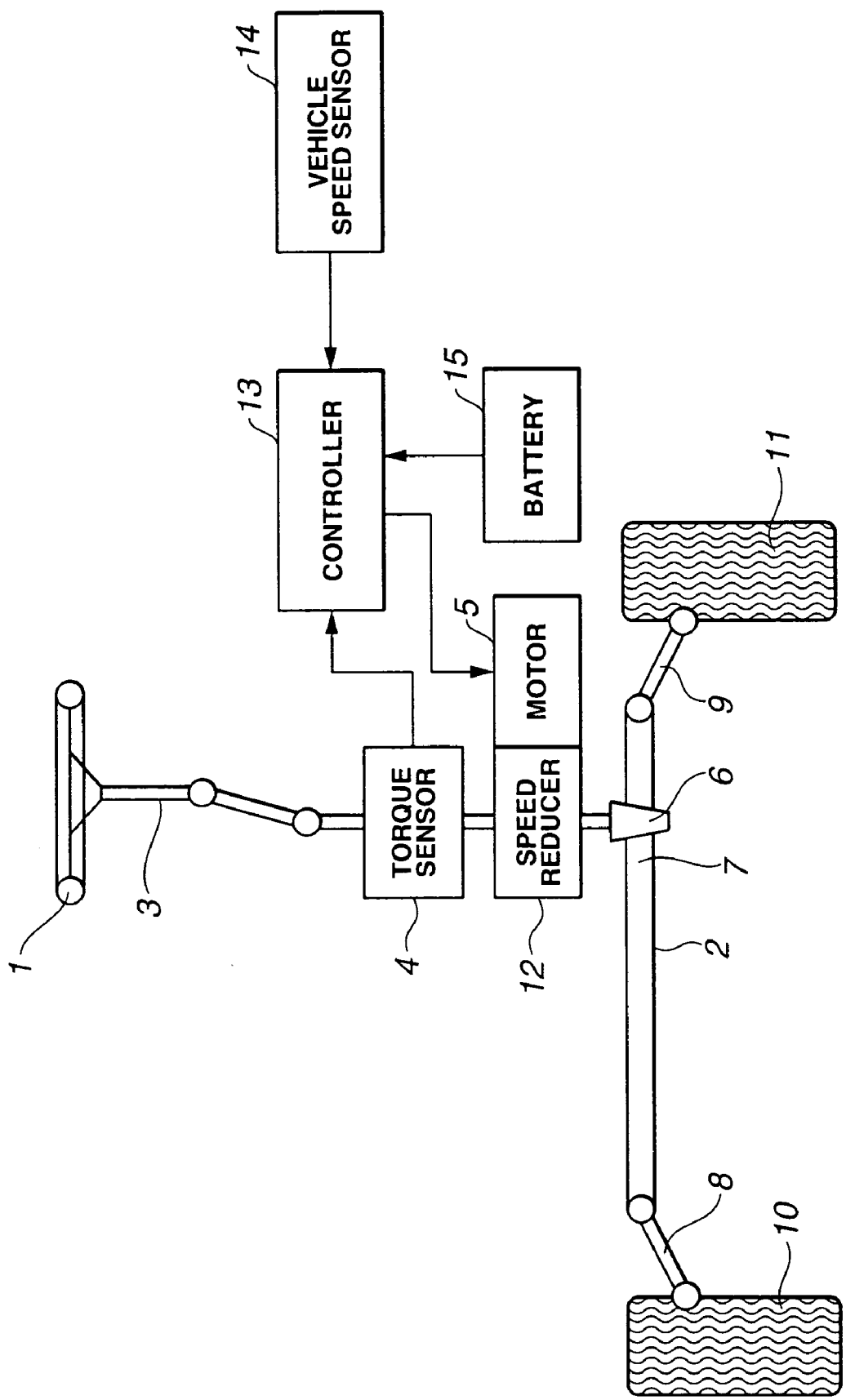
FIG. 1 is a schematic illustration of a first embodiment electric power steering system for an automotive vehicle, according to the present invention.

Referring now to FIG. 1, a first embodiment of an electric power steering system for an automotive vehicle, according to the present invention is illustrated including steering wheel 1 which is operated or turned by a driver to steer the vehicle. Steering wheel 1 is mechanically connected through steering shaft 3 to steering mechanism 2 which is connected to road wheels 10, 11 to steer the vehicle. Torque sensor 4 is disposed to steering shaft 3 to detect a steering torque (or driver's turning torque to the steering wheel) applied to steering shaft 10. Electric motor 5 is disposed to steering shaft 3 to assist a driver's steering effort for turning steering wheel 1, to be applied to the steering wheel.

Steering wheel 1 is located at a position opposite to the driver in a passenger compartment of the vehicle and rotatable around its axis. The steering mechanism 2 is a rack-and-pinion steering gear including a pinion 6 formed integral with a lower end section of the steering shaft 3, and a rack shaft 7 engaged with pinion 6. Rack shaft 7 is installed to a front section of the vehicle in such a manner as to laterally slidably movable relative to the vehicle. The opposite end sections of rack shaft 7 are respectively connected to road wheels 10, 11.

Electric motor 5 is mechanically connected to steering shaft 3 through speed reducer 12 which coverts a torque generated by electric motor 5 to a rotational torque of steering shaft 3. Electric motor 5 is supplied with a motor current (electric current to drive the electric motor) which is controlled by controller 13.

Figure 2:
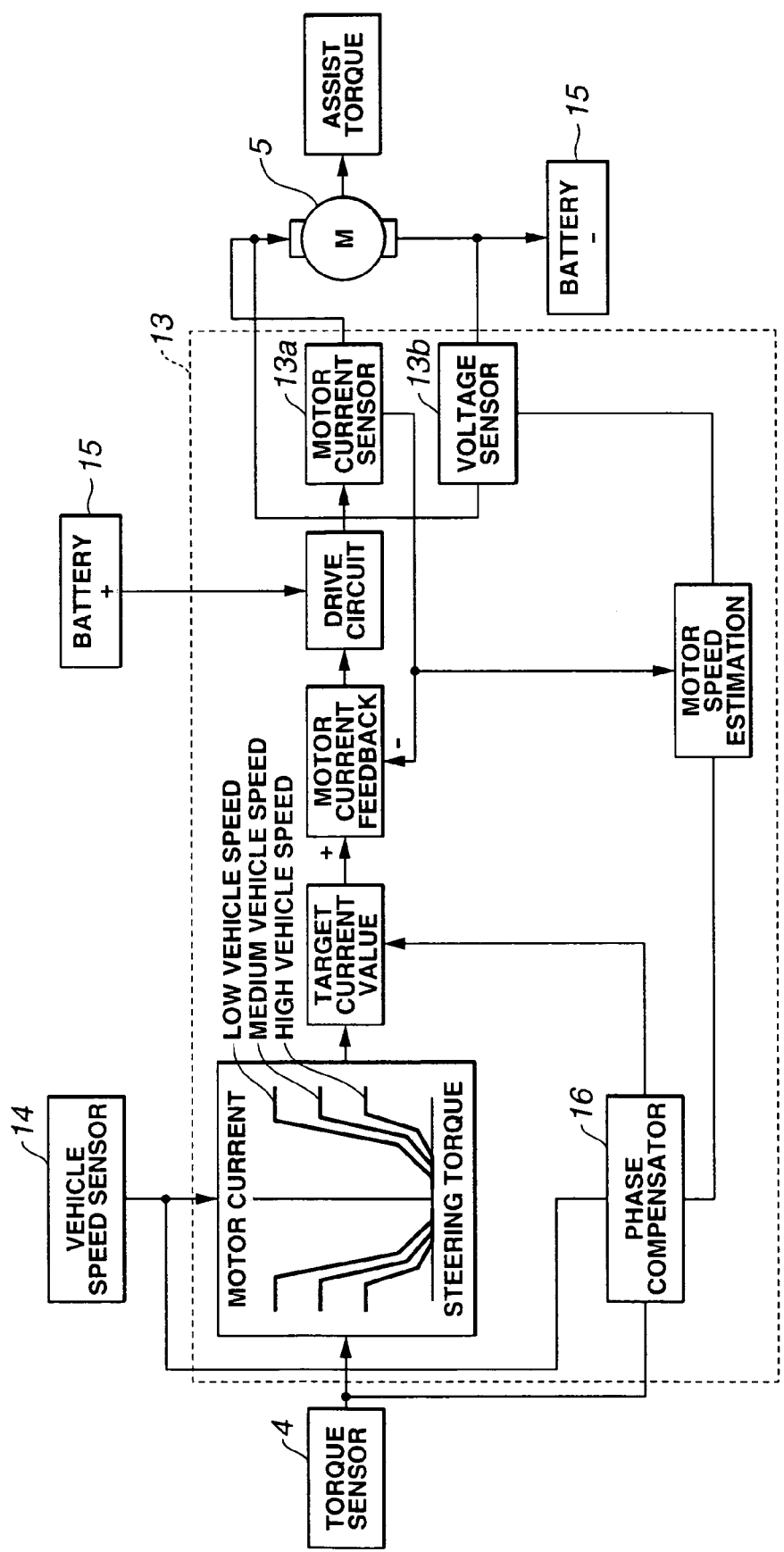
FIG. 2 is a block diagram of a control system of the electric power steering system of FIG. 1.

Subsequently, a control system including controller 13 will be discussed also with reference to FIG. 2.

When steering wheel 1 is operated or turned by the driver, road wheels 10, 11 mechanically connected to steering wheel 1 are turned to steer the vehicle. At this time, a load in a torsional direction is input to torque sensor 4 and then input as a steering torque to controller 13. Additionally, controller 13 is supplied with signals such as a vehicle speed signal from a vehicle speed sensor 14 which detects a vehicle (running) speed of the vehicle.

Controller 13 houses therein motor current sensor 13a for measuring the motor current and motor voltage sensor 13b for measuring a voltage between the terminals of electric motor 5 in order to estimate a rotational speed of electric motor 5 (accomplishing a motor speed estimation). The output (or the motor current) of controller 13 is supplied to electric motor 5 which generates an assist torque for assisting a driver's steering effort required for turning the steering wheel. Controller 13 calculates a drive current (or the motor current) for electric motor 5 in accordance with the steering torque, the rotational speed of electric motor 5, the vehicle speed and the like, and then controllably drives electric motor 5 with the calculated drive current with reference to the motor current detected by motor 5 current sensor 13a. Battery 15 is provided as a power source for supplying electric current to electric motor 5.

In the first embodiment, the detected steering torque by torque sensor 4 is supplied to phase compensator 16 which decides a target current value of the motor current. The target current value is supplied to a drive circuit with reference to the motor current detected by the motor current sensor 13a. Thus, the motor current at the target current value is supplied as a drive command to electric motor 5 so as to cause electric motor 5 to generate a counter-assist torque, i.e., drive electric motor 5 in a direction to increase a steering torque required for turning the steering wheel (accomplishing a counter-assist) against or in response to a transitional torque change or also in the direction to increase the steering torque in a high frequency range of the steering torque. The counter-assist torque is for accomplishing the counter-assist which increases the driver's steering effort required for turning steering wheel 1. The counter-assist is carried out in a counter-assist range in FIG. 4. Phase compensator 16 can be changed in characteristics in accordance with the vehicle running speed, the steering torque and/or a steering speed (or turning speed of steering wheel 1).

Next, phase compensator 16 will be discussed.

Figure 3:
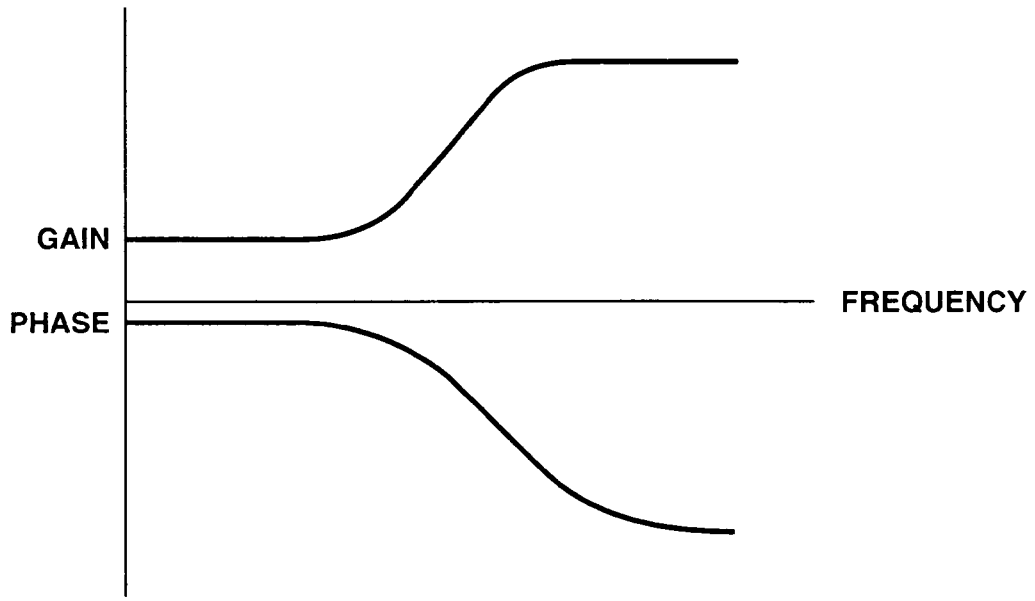
FIG. 3 is a graph showing a frequency characteristics of a phase compensator used in the control system of FIG. 2.

Phase compensator 16 is arranged with the characteristics of time-lag of first order/time-lead of first order so as to have a transfer function as indicated by Eq. (1), exhibiting a frequency characteristics as shown in FIG. 3.

$$C(S)=(1-\tau_{num}S)/(1+\tau_{den}S) \quad (1)$$

Figure 4:
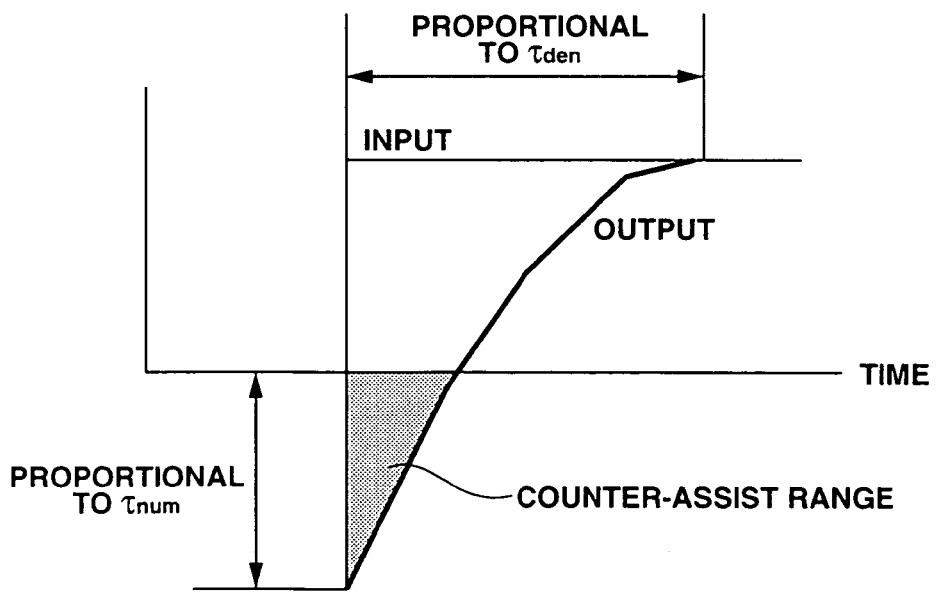
FIG. 4 is a graph showing an input and output characteristics of the phase compensator used in the control system of FIG. 2.

Output of this phase compensator 16 takes a characteristics as shown in FIG. 4 when input of transitional torque (for example, step-like torque) is made to phase compensator 16. In FIG. 4, the downward gain of the output is decided in accordance with the time constant ($\tau_{num}$) of the first order time-lead, and the lag of the output is decided in accordance with the time constant ($\tau_{den}$) of the first order time-lag.

As will be understood from the time series of the output as shown in FIG. 4, controller 13 is arranged to decide the target current value which accomplishes the counter-assist to increase a driver's steering effort required for turning the steering wheel immediately after input of the transitional torque, and then accomplishes an assist (for steering) to decrease the driver's steering effort required for turning the steering wheel. The assist (for steering) is carried out under an assist torque generated by the electric motor 5.

As discussed above, in the first embodiment electric power steering system, the counter-assist is carried out when the steering torque is changed in direction, for example, when a slight correction steering is made during straight-ahead running of the vehicle. At this time, the driver's steering effort for turning the steering wheel is increased. This can teach to the driver such a steering position that the vehicle makes its straight-ahead running, thereby providing a good steering feeling having a neutral-steering feeling to the driver.

Additionally, in the first embodiment electric power steering system, a torque for the counter-assist increases as the frequency of the steering torque becomes higher. Accordingly, the amount of the counter-assist increases to increase the driver's steering effort required for turning the steering wheel when a quick steering or turning of the steering wheel is made, for example, at a lane-change during a high speed vehicle running. Additionally, under the action of the counter-assist, a steering stiffness is lowered thereby making a steering characteristics (or vehicle behavior to steering amount) understeer thus improving a running stability of the vehicle.

A second embodiment of the electric power steering system will be discussed with reference to FIG. 5. The second embodiment is similar to the first embodiment with the exception that the gain of phase compensator 16 is changed in accordance with the steering torque.

Figure 5:
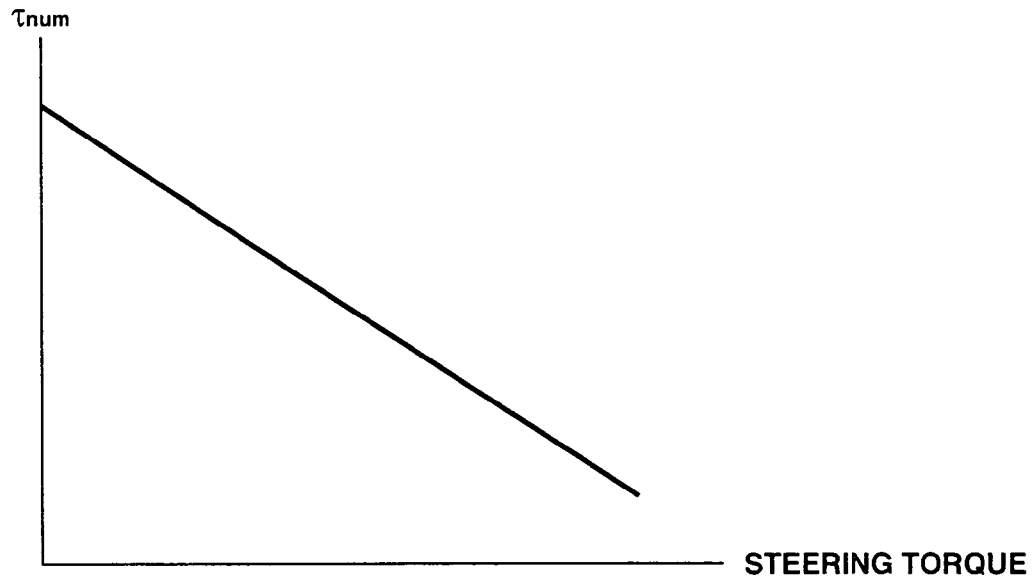
FIG. 5 is a graph showing an example for setting a time constant of first order time-lead relative to a steering torque, in connection with a phase compensator used in a control system of a second embodiment electric power steering system according to the present invention.

FIG. 5 shows an example of setting the time constant ($\tau_{num}$) of the first order time-lead relative to the steering torque, in which the time constant ($\tau_{num}$) of the first order time-lead is set smaller as the steering torque becomes larger. In other words, in this second embodiment, the amount of the counter-assist becomes larger when the steering torque is smaller.

Accordingly, in the second embodiment electric power steering system, the neutral steering feeling can be produced during the straight-ahead running of the vehicle. Additionally, the counter-assist can be accomplished to increase the driver's steering effort required for turning steering wheel 1 when a driver's additional turning of the steering wheel is made from a maintained steering position or a driver's return tuning of the steering wheel from a maintained steering position is made during turning of the vehicle, thereby producing a steady feeling for steering during vehicle turning.

A third embodiment electric power steering system will be discussed with reference to FIG. 6. The third embodiment is similar to the first embodiment with the exception that the gain of phase compensator 16 can be changed in accordance with the vehicle speed.

Figure 6:
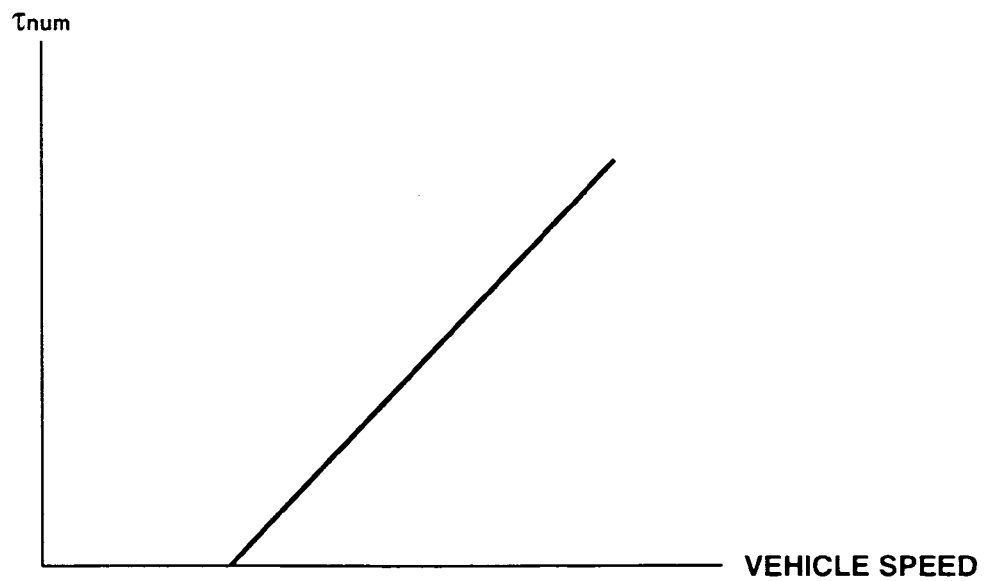
FIG. 6 is a graph showing an example for setting a time constant of first order time-lead relative to a vehicle speed, in connection with a phase compensator used in a control system of a third embodiment electric power steering system according to the present invention.

FIG. 6 shows an example of setting the time constant ($\tau_{num}$) of the first order time-lead relative to the vehicle speed, in which the time constant ($\tau_{num}$) of the first order time-lead is set to become large in proportion to the vehicle speed. In other words, in this third embodiment, the amount of the counter-assist becomes larger as the vehicle speed is higher.

Accordingly, in the third embodiment electric power steering system, the neutral steering feeling can be produced in accordance with the vehicle speed. In other words, at a low vehicle speed, the amount of the counter-assist decreases thereby lightening operator's steering operation. At a high vehicle speed, the amount of the counter-assist increases thereby making is possible to produce the neutral steering feeling of steering wheel 1 thus improving a running stability of the vehicle.

A fourth embodiment electric power steering system according to the present invention will be discussed with reference to FIG. 7. The fourth embodiment is similar to the first embodiment with the exception that the gain of phase compensator 16 is changed in accordance with the steering speed of steering wheel 1.

Figure 7:
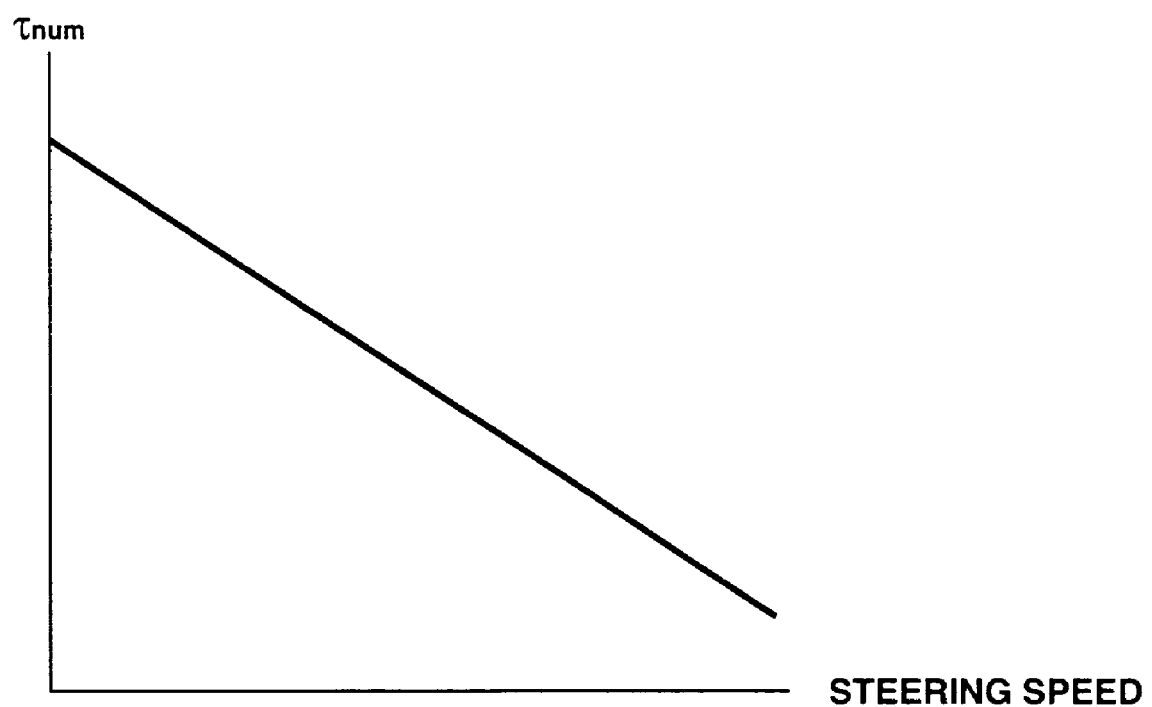
FIG. 7 is a graph showing an example for setting a time constant of first order time-lead relative to a steering speed, in connection with a phase compensator used in a control system of a fourth embodiment electric power steering system according to the present invention.

FIG. 7 shows an example of setting the time constant ($\tau_{num}$) of the first order time-lead relative to the steering speed, in which the time constant ($\tau_{num}$) of the first order time-lead is set smaller as the steering speed becomes larger. In other words, in this second embodiment, the amount of the counter-assist becomes larger as the steering speed is smaller.

The steering speed is calculated by using a back electromotive force of motor 5. A rotational speed ($d\theta/dt$) of motor 5 is represented by Eq. (2).

$$d\theta/dt=I\times(V-RI)/K \quad (2)$$

where V is the voltage between the terminals of motor 5; I is the motor current; K is the back electromotive force coefficient; and R is the internal resistance of electric motor 5.

Here, K and R are assumed to be nearly constant, and therefore the rotational speed (dθ/dt) of motor 5 can be calculated or estimated by measuring the terminal voltage V of motor 5 and the motor current I. Since motor 5 is mechanically connected to steering shaft 3, the steering speed of steering wheel 1 is estimated by multiplying the rotational speed (dθ/dt) of motor 5 by a speed reduction ratio of speed reducer 12.

Accordingly, in the fourth embodiment electric power steering system, the driver's steering effort required for turning the steering wheel cannot be unnecessarily increased in case that the driver's steering operation or turning of the steering wheel is made at a steering speed over a normal level, such as during an emergency accident avoidance or the like. Thus, a driver's smooth steering operation becomes possible so that it for the emergency accident avoidance cannot be prevented.

While the invention has been described in the first and fourth embodiments, it will be understood that the present invention is not limited to the embodiments, so that modifications or the like may be made without departing from the spirit of the invention. For example, although the time constant ($\tau_{num}$) of the first order time-lead of phase compensator 16 has been described to be changed in accordance with the steering torque in the second embodiment, with the vehicle speed in the third embodiment, and with the steering speed in the fourth embodiment, it will be appreciated that the time constant ($\tau_{num}$) of the first order time-lead may be changed in accordance with three parameters such as the steering torque, the vehicle speed and the steering speed. Additionally, although the power steering systems of the first to fourth embodiments have been described and shown to be arranged such that the steering shaft is mechanically connected to the steering mechanism, it will be understood that the principle of the present invention may be applied to other power steering systems in which the steering shaft is not mechanically connected to the steering mechanism.

As appreciated from the above, according to the present invention, the counter-assist is carried out when the steering torque is changed in direction, for example, when the slight correction steering is made during straight-ahead running of the vehicle. At this time, the driver's steering effort for turning the steering wheel or steering shaft is increased. This can teach to the driver such a steering position that the vehicle makes its straight-ahead running thereby providing a good steering feeling having a neutral-steering feeling to the driver.

The entire contents of Japanese Patent Application P2003-392825 (filed Nov. 21, 2003) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An electric power steering system comprising:
    a steering torque detecting device which detects a steering torque of a steering shaft;
    an electric motor which generates an assist torque for assisting a driver's steering effort required for steering the vehicle and a counter-assist torque for increasing the driver's steering effort, the assist torque and the counter-assist torque being applied to a steering mechanism; and
    a controller which outputs a drive command to the electric motor in accordance with the detected steering torque, the drive command being for causing the electric motor to generate the counter-assist torque when the detected steering torque is a transitional torque.

2. An electric power steering system as claimed in claim 1, wherein the controller is arranged to increase the counter-assist torque as a frequency of the detected steering torque becomes higher.

3. An electric power steering system as claimed in claim 1, wherein the controller comprises a phase compensating device which compensates phase lag and phase lead of the steering torque, wherein the controller is arranged to output the drive command in accordance with the steering torque whose phase lag and phase lead are compensated.

4. An electric power steering system as claimed in claim 3, wherein the controller is arranged to change at least one of a gain and a time constant of the phase compensating device in accordance with the detected steering torque.

5. An electric power steering system as claimed in claim 3, further comprising a vehicle speed detecting device which detects a vehicle speed of the vehicle, wherein the controller is arranged to change at least one of a gain and a time constant of the phase compensating device in accordance with the detected vehicle speed.

6. An electric power steering system as claimed in claim 3, further comprising a steering speed detecting device which detects a steering speed, wherein the controller is arranged to change at least one of a gain and a time constant of the phase compensating device in accordance with the detected steering speed.

7. An electric power steering system comprising:
    steering torque detecting means for detecting a steering torque of a steering shaft;
    an electric motor which generates an assist torque for assisting a driver's steering effort required for steering the vehicle and a counter-assist torque for increasing the driver's steering effort, the assist torque and the counter-assist torque being applied to a steering mechanism; and
    control means for outputting a drive command to the electric motor in accordance with the detected steering torque, the drive command being for causing the electric motor to generate the counter-assist torque when the detected steering torque is a transitional torque.

8. A method of operating an electric power steering system, comprising:
    detecting a steering torque of a steering shaft;
    generating an assist torque for assisting a driver's steering effort required for steering the vehicle and a counter-assist torque for increasing the driver's steering effort by using an electric motor, the assist torque and the counter-assist torque being applied to a steering mechanism; and
    outputting a drive command from a controller to the electric motor in accordance with the detected steering torque, the drive command being for causing the electric motor to generate the counter-assist torque when the detected steering torque is a transitional torque.

* * * * *